United States Patent Office 2,697,079
Patented Dec. 14, 1954

2,697,079

ION-EXCHANGE RESINS CONTAINING QUATERNARY AMMONIUM HYDROXIDE GROUPS

Gaetano F. D'Alelio, Pittsburgh, Pa., assignor to Koppers Company, Inc., a corporation of Delaware No Drawing. Application December 5, 1951, Serial No. 260,081

9 Claims. (Cl. 260—2.1)

This invention relates to new anion-exchange resins. More particularly it relates to the preparation of anion-exchange resins having quaternary ammonium hydroxide groups.

Ion-exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Anion-exchange resins used for some of these purposes are disclosed in applicant's U. S. Patent 2,366,008, assigned to the General Electric Company, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehye resins, and the phenol-formaldehyde-diethylene-triamine and triethylene-tetraamine resins, etc. However, the efficiency of these resins is not sufficiently satisfactory for many anion exchange purposes.

Anion-exchange resins of great utility have now been found which comprise water-insoluble, infusible resins containing quaternary ammonium hydroxide groups, the resins comprising polymers having a plurality of units of the formula

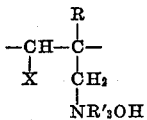

where X is hydrogen or a quaternary ammonium hydroxide group of the formula $$-CH_2-NR'_3OH$$

R is hydrogen or a methyl or ethyl group; R' is an alkyl group or an aralkyl group.

Various examples of anion-exchange resins suitable for the practice of this invention include polymers which are derivable from monomer units having the following structure:

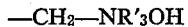

wherein X, R and R' are as above-described.

Thus, the resins of this invention may be regarded as having the following monomer structure, although the resins can advantageously be prepared indirectly from other types of monomers as illustrated hereinafter.

(a) $CH_2=CH-CH_2-N(CH_3)_3OH$ (b) $CH_2=CH-CH_2-N(C_2H_5)_3OH$

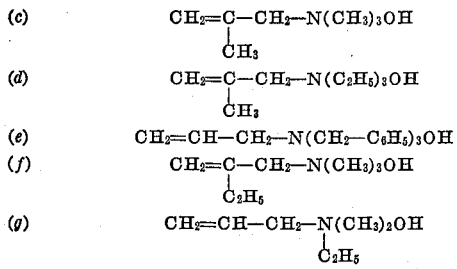

The quaternary ammonium hydroxide resins of this invention can be prepared by a number of methods. For example, certain polymerizable monomers can be polymerized directly to resins having quaternary ammonium hydroxide groups. Thus, a typical resin may be considered as derived by the polymerization of allyl-trimethyl ammonium hydroxide $$CH_2=CH-CH_2-N(CH_3)_3OH$$

A resin of this basic structure can be prepared by the polymerization of acrylonitrile, advantageously with a cross-linking agent, and subsequent reduction and exhaustive alkylation of the polymer to give the same type of resin having quaternary ammonium hydroxide groups. Similar quaternary ammonium hydroxide resins can also be prepared by the indirect method from methacrylonitrile, fumaronitrile, ethacrylonitrile, etc., that is, from cyano compounds having the formula $$Y-CH=CR-CN$$

wherein Y is hydrogen or a cyano group; and R is hydrogen or a methyl or ethyl group.

In most cases the polymerizable monomer, or mixture of polymerizable monomers, which contains the quaternary ammonium hydroxide group, or a group convertible thereto, is converted to an insoluble, infusible resin by copolymerization with one or more cross-linking agents. Cross-linking agents which are not necessarily equivalent but which are suitable for the purpose of this invention include various classes of hydrocarbon-type cross-linking agents, e. g., those having a hydrocarbon nucleus, with or without nonhydrocarbon substituents attached thereto, such as divinyl aryls, e. g., divinyl benzenes, divinyl naphthalenes, divinyl toluenes, divinyl xylenes, divinyl chlorobenzenes, divinyl diphenyls, etc., or other hydrocarbon-type cross-linking agents, such as butadiene, chloroprene, isoprene, cyclopentadiene, isopropenyl styrenes, diisopropenyl benzenes, vinyl cyclohexene, 1-phenyl-butadiene, 2-phenyl-butadiene, etc. Any substituents attached to the hydrocarbon nucleous of these cross-linking agents should be such as will not interfere with any of the steps of preparation or use of the anion-exchange resins. When these hydrocarbon-type cross-linking agents are used, it is generally advantageous to use about 2–25 per cent by weight of the cross-linking agent. In some cases, however, insolubility and infusibility may be imparted to the resin by the use of a monomer which has or will give the structure shown in the formula above and which also has more than one polymerizable group, e. g., by starting with cyano-butadienes, etc., which can be used alone or with other monomers having quaternary ammonium hydroxide groups or groups which can be converted thereto.

In other cases, it is even possible to have the cross-linking effected by an alkylene or aralkylene group connecting two polymer chains by attachment to a nitrogen in each chain. Generally, this type of cross-linking may not be preferred since some of the quaternary ammonium hydroxide groups are thereby restricted in their movements and are therefore not so easily accessible for anion-exchange activity. The latter type of cross-linking may be accomplished, during or subsequent to the exhaustive alkylation, either by use of a polychloroalkyl, aryl polychloroalkyl, or polychloroalkylaryl compound, such as dichloroethylene, phenyl - di - chloroethylene, di-(chloromethyl)-benzene, etc., or by the use of a polyhydric alcohol as a solvent in the reduction of a cyano group to an amine. Moreover, it is often permissible to have somewhat similar cross-linking accomplished by the formation of secondary amines, sometimes during the reduction of cyano groups, etc., to give ultimately cross-linking of the type

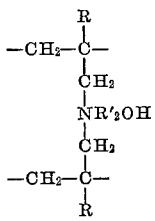

In this latter event, an R' of the formula becomes a

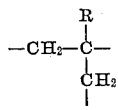

group.

In the preparation of these quaternary ammonium hydroxide resins from polymers containing cyano or other groups reducible to amino groups, any convenient method of hydrogenation may be used to convert the nitrogen-containing groups to amino groups. Such hydrogenations may be activated by various well-known hydrogenation catalysts including palladium on charcoal, Raney nickel, platinum, cobalt, nickel, copper, aluminum, iron, zinc, etc. With some compounds such as alkyl cyanides, alkyl oximes and alkyl hydrozines, reduction to amines may be accomplished by the use of sodium and an alcohol such as ethanol. Moreover, iron and water catalyzed by ferrous chloride may be used to reduce nitro compounds to amines. In some cases, exhaustive or partial alkylation may be carried on simultaneously with the reduction by the use of alcohol solvents corresponding to the alkyl or aralkyl group desired for the alkylation.

For certain purposes which do not require anion-exchange resins of the highly basic character of the quaternary ammonium hydroxide resins, the intermediate amine resins of this invention can be used quite satisfactorily. These amine resins can be regarded as having repeating units of the structure

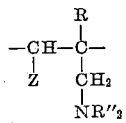

wherein Z is hydrogen or a —CH₂—NR″₂ group; R is hydrogen or a methyl or ethyl group; and R″ is hydrogen or an alkyl or aralkyl group. Thus, copolymers of acrylonitrile, methacrylonitrile, fumaronitrile, ethacrylonitrile, etc., when reduced to the corresponding amino compounds give water-insoluble, anion-exchange resins such as cross-linked polyallyl amine, polymethallyl amine, polyaminomethyl polymethylene (polymerized 1,4-diamino-butene-2 or 1,2-bis-amino-methyl-ethylene), polyethallyl amine, etc. Moreover, the partially substituted amine intermediates have utility as anion-exchange resins, e. g., the mono-, di- and tri-substituted amines such as mono-, di- and tri-methyl derivatives of polyallyl amine, polymethallyl amine, polyaminomethyl polymethylene, polymerized ethallyl amine, etc. With such amine intermediates which are to be used per se as anion-exchange resins, the cross-linking agents may be of the same type described hereinbefore as satisfactory for the quaternary ammonium hydroxide anion-exchange resins.

Where exhaustive alkylation of an amine is to be effected, this is accomplished by heating the amine with a slight excess of the proper number of molecular equivalents of alkyl halide or substituted alkyl halide selected to give the desired R' group. The tetraalkyl ammonium salt thus produced is converted to the tetraalkyl ammonium hydroxide by reaction with alkaline reagents, such as aqueous or alcoholic sodium hydroxide or potassium hydroxide, aqueous sodium carbonate, etc. After anion-adsorption, the exhausted resin may be regenerated by the use of the same type of alkaline solutions as used in the original conversion of the quaternary ammonium salt to the hydroxide.

Minor portions of certain other monomers such as isobutylene, styrene, chlorostyrene, etc., may be used with the aforementioned monomers. However, these latter monomers should not have functional groups which will interfere with the polymerization activities of the monomers or with the ion-exchange activity of the products, or which may be ruptured to give substantial decrease in length of monomer chains or in cross-linking. Moreover, the cross-linking agent which is used should not contain any such interfering functional groups.

Since the quaternary ammonium hydroxide groups are the active ion-removing groups in these products, it is advantageous that the major portion of the polymerization mixture be of polymerizable monomers containing quaternary ammonium hydroxide groups or groups convertible thereto. Instead of starting with a monomer mixture containing the cross-linking agent, it is also possible to add the cross-linking agent to partial polymers of these monomers and to effect cross-linking by subsequently completing the polymerization.

The following examples illustrate more particularly the above-described methods for preparing ion-exchange resins.

*Example I*

Into a glass container are placed 7 parts of Turkey red oil, 300 parts of distilled water, 0.7 part of benzoyl peroxide, 90 parts of freshly distilled acrylonitrile and 10 parts divinyl benzene in the order named. The glass container is closed with a seal lined with aluminum foil and is revolved in a water bath heated at about 60° C. for about 30 hours. The peroxide polymerization catalyst is destroyed by adding about one part of a 10% aqueous solution of hydrazine. The dispersion is then transferred to a high pressure autoclave fitted with a stirrer and 5 parts of Raney nickel (see U. S. Patent No. 1,628,190) is added thereto along with 30 parts of concentrated aqueous ammonia. The contents of the autoclave are then heated with rapid stirring at 135° C. to 145° C. while maintaining a pressure of 750 pounds per square inch with hydrogen. The treatment is continued until absorption with hydrogen ceases. The insoluble, cross-linked polymer containing primary amine groups obtained by hydrogenation of the cyano groups is separated by filtration.

These amine groups are converted to the quaternary ammonium bromide form by suspending the resin in ethyl bromide in a container equipped with a reflux condenser and refluxing the mixture for approximately 24 hours. The resin containing the quaternary ammonium bromide groups is separated from the ethyl bromide by filtration and washed with a small volume of a volatile organic solvent such as diethyl ether. Upon treatment of this resin with approximately ⅓ normal sodium hydroxide solution, there is obtained the quaternary ammonium hydroxide form of the resin.

*Example II*

One hundred parts by weight of the resin of Example I is wet with 50 parts by weight of distilled water, and then 100 parts by weight of a standardized hydrochloric acid solution is added with shaking. After the resin and the solution have been in contact for about 15 minutes, the solution is separated from the resin by filtration. The filtrate solution is then titrated with sodium hydroxide to determine the amount of hydrochloric acid still in solution. If the filtrate solution has been completely neutralized by the resin, the procedure is repeated using a larger amount of the hydrochloric acid solution with a fresh sample of the resin. The efficiency of the resin is determined by calculating the ratio of chloride ions actually removed from the solution to the chloride ions theoretically removable. A good efficiency is indicated by these calculations.

*Example III*

The exhausted resin of Example II is regenerated by treatment with about ⅓ normal sodium hydroxide solution. After the solution is removed by filtration the resin is washed well with distilled water and retested for its anion-adsorption capacity according to the above-mentioned procedure. The efficiency after regeneration approximates the original capacity of the resin.

*Example IV*

Into a glass container are placed 7 parts of Turkey red oil, 300 parts of distilled water, 0.7 part of benzoyl peroxide and 100 parts of freshly distilled methacrylonitrile in the order named. The glass container is closed with a seal lined with aluminum foil and is revolved in a water bath heated at about 60° C. for about 30 hours. A stable latex of polymethacrylonitrile is obtained. The peroxide polymerization catalyst is destroyed by adding about one part of a 10% aqueous solution of hydrazine. The dispersion is then transferred to a high pressure autoclave fitted with a stirrer and 5 parts of Raney nickel (see U. S. Patent No. 1,628,190) is added thereto along with 30 parts of concentrated aqueous ammonia. The contents of the autoclave are then heated, with rapid stirring, at 135° C. to 145° C. while maintaining a pressure of about 750 pounds per square inch with hydrogen. The treatment is continued until absorption of hydrogen ceases. The aqueous product is then boiled to remove ammonia. The water is removed by distillation under vacuum and cross-linking of the linear polymer chains is effected by treating the resin with 10 parts 1,2-dichloroethane at reflux temperature. There is obtained a water insoluble resin cross-linked through a portion of the amino nitrogen atoms of the resin.

This resin is admixed with excess ethyl bromide and maintained at reflux temperature for approximately one day to effect exhaustive alkylation. There is obtained the quaternary ammonium bromide form of the resin. Treatment with approximately ⅓ ammonium hydroxide yields the quaternary ammonium hydroxide form of the resin.

This resin is tested by the procedures outlined in Examples II and III and efficiency of slightly less than that of the resin described in Example I is indicated.

*Example V*

To 90 parts allyl trimethyl ammonium hydroxide and 10 parts divinyl benzene is added 1 part benzoyl peroxide and the mixture is maintained at 60° C. for about one week. The insoluble, infusible resin which is obtained is comminuted and is tested according to the procedures outlined in Examples II and III. A good efficiency is indicated.

The quaternary ammonium hydroxide resins of this invention are very efficient anion-adsorption agents due very likely to the highly basic character of the quaternary ammonium hydroxide groups. Other anions which may be removed from solution by the water-insoluble polymers of this invention, in addition to the chloride anions previously mentioned, include nitrate ions, sulfate ions, acetate ions, oxalate ions, tartrate ions, or any other anions which will react with the basic quaternary ammonium hydroxide groups in the resin to form insoluble salts. Apparently because of the highly basic character of the quaternary ammonium hydroxide groups, these resins are more efficient than the previously used amine-type anion-exchange resins. These anion-exchange resins can be readily regenerated by washing with a dilute alkali sosolution, preferably of an alkali-metal hydroxide which forms soluble salts with the adsorbed anions.

The cross-linked copolymers suitable for the practice of this invention can be prepared by any method which will give infusible, insoluble resins, for example, by mass, solution, emulsion or suspension polymerization. The polymerizations may be advantageously catalyzed by various types of catalysts, such as peroxides, e. g., benzoyl, hydrogen, acetyl, acetyl-benzoyl, phthalyl, lauroyl peroxides, tert-butylhydroperoxide, etc.; other per-compounds, e. g., ammonium persulfate, sodium persulfate, sodium perchlorate, etc.; and in some cases the Friedel-Crafts type catalysts, such as aluminum chloride, advantageously at low temperatures.

Inert material, such as diatomaceous earth, alundum, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

This application is a continuation-in-part of application Serial Number 117,728 filed September 24, 1949, now abandoned.

The invention as hereinbefore set forth is embodied in particular form and manner but may be variously embodied within the scope of the claims hereinafter made.

I claim:
1. A water-insoluble resin comprising a polymer having a plurality of repeating units having the structure

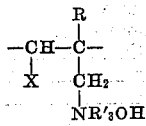

wherein X is a member of the class consisting of hydrogen and quaternary ammonium hydroxyl groups of the formula —CH$_2$—NR'$_3$OH; R is a member of the class consisting of hydrogen and methyl and ethyl groups; and R' is a member of the class consisting of alkyl and aralkyl groups, and in which the polymer has been cross-linked by a copolymerized divinyl aryl compound.

2. A water-insoluble resin comprising the polymerization product of a polymerizable mass comprising a copolymerizable divinyl aryl compound and at least one polymerizable monomer of the formula

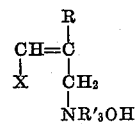

wherein X is a member of the class consisting of hydrogen and —CH$_2$—NR'$_3$OH groups; R is a member of the class consisting of hydrogen and alkyl groups of less than 3 carbon atoms; and R' is a member of the class consisting of alkyl and aralkyl groups.

3. A water-insoluble resin of claim 1, in which the divinyl aryl compound is divinyl benzene.

4. A process for preparing water-insoluble anion-exchange resins comprising the steps of exhaustively alkylating with an agent capable of furnishing groups chosen from the class consisting of alkyl and aralkyl groups the amino groups in a polymeric amine and thereafter converting the resultant quaternary ammonium salt groups to quaternary ammonium hydroxide groups, said polymeric amine containing repeating units having the structure

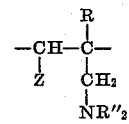

wherein Z is a member of the class consisting of hydrogen and —CH$_2$—NR''$_2$ groups; R is a member of the class consisting of hydrogen and methyl and ethyl groups; and R'' is a member of the class consisting of hydrogen and alkyl and aralkyl groups, and in which the polymeric amine has been cross-linked by a copolymerized divinyl aryl compound.

5. A process of claim 4, in which the polymeric amine has been cross-linked by a divinyl benzene.

6. A process of claim 4, in which the polymeric amine contains repeating units having a structure identical with allyl amine.

7. A process of claim 6, in which the polymeric amine has been cross-linked by a divinyl benzene.

8. The method of treating liquid media to remove anions therefrom which comprises contacting said media with a water-insoluble resin comprising a polymer having a plurality of repeating units of the structure

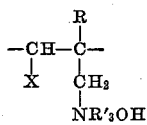

wherein X is a member of the class consisting of hydrogen and quaternary ammonium hydroxide groups of the formula —CH$_2$—NR'$_3$OH; R is a member of the class consisting of hydrogen and methyl and ethyl groups; and R' is a member of the class consisting of alkyl and aralkyl groups, and in which said polymer has been cross-linked by a copolymerized divinyl aryl compound.

9. The method of claim 8, in which the polymer has been cross-linked by copolymerized divinyl benzene.

(References on following page)

References Cited in the file of this patent

UNITED STATES PATENTS

| Number | Name | Date |
|---|---|---|
| 2,228,514 | Griessbach | Jan. 14, 1941 |
| 2,366,008 | D'Alelio | Dec. 26, 1944 |
| 2,456,428 | Parker | Dec. 14, 1948 |
| 2,481,768 | Mills | Sept. 13, 1949 |
| 2,543,666 | Michael | Feb. 27, 1951 |
| 2,591,573 | McBurney | Apr. 1, 1952 |

OTHER REFERENCES

Butler: Jour. Amer. Chem. Soc., vol. 71, pages 3120–3122, September 1949.